US011359131B2

(12) United States Patent
Whitfill et al.

(10) Patent No.: US 11,359,131 B2
(45) Date of Patent: Jun. 14, 2022

(54) MULTI-MODAL, LOW PARTICLE SIZE DISTRIBUTION LOST CIRCULATION MATERIAL

(71) Applicant: Halliburton Energy Services, Inc., Houston, TX (US)

(72) Inventors: Donald Lee Whitfill, Kingwood, TX (US); Ifueko Akpata, Katy, TX (US); V. Ramireddy Devarapalli, Pune (IN); Mohamed Abdel Salam, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 99 days.

(21) Appl. No.: 16/881,743

(22) Filed: May 22, 2020

(65) Prior Publication Data

US 2021/0363405 A1 Nov. 25, 2021

(51) Int. Cl.
*C09K 8/516* (2006.01)
*C09K 8/035* (2006.01)
*C09K 8/03* (2006.01)

(52) U.S. Cl.
CPC .............. *C09K 8/516* (2013.01); *C09K 8/032* (2013.01); *C09K 8/035* (2013.01)

(58) Field of Classification Search
CPC ........ C09K 8/032; C09K 8/035; C09K 8/467; C09K 8/487; C09K 2208/04; C09K 2208/08
See application file for complete search history.

(56) References Cited

U.S. PATENT DOCUMENTS

| 3,150,085 | A | * | 9/1964 | Mallory | C09K 8/28 507/116 |
|---|---|---|---|---|---|
| 10,227,521 | B2 | | 3/2019 | Jamison et al. | |
| 10,633,940 | B2 | | 4/2020 | Pisklak et al. | |
| 2016/0137903 | A1 | | 5/2016 | Friedheim et al. | |
| 2016/0237768 | A1 | | 8/2016 | Jamison et al. | |
| 2016/0333247 | A1 | * | 11/2016 | Whitfill | C09K 8/516 |
| 2018/0016483 | A1 | | 1/2018 | Amanullah | |

FOREIGN PATENT DOCUMENTS

| AU | 2014383162 B2 | 3/2017 |
|---|---|---|
| CA | 2936909 C | 4/2020 |
| WO | 2011/149479 A1 | 12/2011 |
| WO | 2020081053 A1 | 4/2020 |

OTHER PUBLICATIONS

International Search Report and Written Opinion issued in related PCT Application No. PCT/US2020/034892 dated Feb. 18, 2021, 12 pages.

* cited by examiner

*Primary Examiner* — Aiqun Li
(74) *Attorney, Agent, or Firm* — Conley Rose, P.C.; Rodney B. Carroll (57) ABSTRACT

Methods and compositions for treating subterranean formations with fluids containing lost circulation materials are provided. In one embodiment, the methods introducing a treatment fluid that includes a base fluid and a lost circulation material into a wellbore penetrating at least a portion of a subterranean formation, wherein the lost circulation material includes a plurality of particles having a multi-modal particle size distribution comprising a d10 value ranging from about 20 to about 50 microns, a d50 value ranging from about 55 to about 90 microns, and d90 value ranging from about 240 to about 340 microns.

10 Claims, 3 Drawing Sheets

MULTI-MODAL, LOW PARTICLE SIZE DISTRIBUTION LOST CIRCULATION MATERIAL

BACKGROUND

The present disclosure relates to compositions and methods for treating subterranean formations, and more specifically, relates to treatment fluids that include a lost circulation material additive, and methods of using such treatment fluids in treating subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. For example, a treatment fluid may be used to drill a wellbore in a subterranean formation or to complete a wellbore in a subterranean formation, as well as numerous other purposes.

A drilling fluid, or "mud," which a drilling fluid is also often called, is a treatment fluid that is circulated in a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts.

During drilling, fracturing, or other treatment of subterranean formations, the drilling fluid being circulated through the wellbore may be lost into the surrounding formation. Fluids are typically lost into the formation through fractures induced by excessive mud pressures, pre-existing open fractures, or large openings with structural strength in the formation (i.e., "loss zones"). In addition to underground blowouts, cross flow, and loss of hydrostatic pressure, lost circulation can lead to a drill pipe becoming lodged in the wellbore. In some instances, drilling may be terminated to allow for a remedial operation to be performed. Also during many drilling operations, the drilling fluid is circulated through the wellbore (e.g., down the drill string and back up through the annulus between the drill string and the wellbore), passed through shakers to remove cuttings and debris produced during drilling, and recirculated back into the wellbore. Shakers typically include one or more screens with holes of a specific size (also referred to as the mesh size of the screen) to allow smaller particles and fluid through but retain larger particles for removal.

In some drilling operations when lost circulation is observed, lost circulation materials ("LCM") may be added to drilling fluids for plugging the portion of formation through which the fluids are being lost. A variety of LCMs have been used or proposed for arresting lost circulation of drilling fluids. However, in some instances, traditional lost circulation materials may be too large to bypass components or pieces of equipment associated with the preparation, delivery, recapture, recycling, reuse, and/or disposal of the LCM (e.g., a shaker screens) or too small to effectively reduce or prevent lost circulation.

BRIEF DESCRIPTION OF THE DRAWINGS

These drawings illustrate certain aspects of some of the embodiments of the present disclosure and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming but would nevertheless be a routine undertaking for those of ordinary skill in the art having the benefit of the present disclosure.

The present disclosure relates to methods and compositions for treating subterranean formations. More particularly, the present disclosure relates to methods and compositions related to multi-modal, low particle size distribution ("PSD") lost circulation material for use in treating subterranean formations.

More specifically, the methods and compositions of the present disclosure may generally include a base fluid and a lost circulation material including a plurality of particles having a multi-modal particle size distribution including a d10 value ranging from about 20 to about 50 microns, a d50 value ranging from about 55 to about 90 microns, and d90 value ranging from about 240 to about 340 microns.

Among the many potential advantages to the methods and compositions of the present disclosure, only some of which are alluded to herein, the methods, compositions, and systems of the present disclosure may provide improved lost circulation materials for use in subterranean formations. For example, in certain embodiments, the methods and compositions of the present disclosure may provide smaller particle size lost circulation materials with increased loss zone plugging efficiency. In certain embodiments, the lost circulation materials of the present disclosure may have a smaller PSD and an increased loss zone plugging efficiency. In certain embodiments, the smaller lost circulation materials may be easier to retain in drilling fluid when circulated in components or pieces of equipment associated with the preparation, delivery, recapture, recycling, reuse, and/or disposal of the lost circulation material.

In one or more embodiments, the treatment fluids of the present disclosure may be used to treat at least a portion of a subterranean formation. Such treatment fluids may include, but are not limited to, drilling fluids, completion fluids, gravel pack fluids, loss circulation fluids, pills, fracturing fluids, plugging fluids, cementing fluids, and abandonment fluids.

In one or more embodiments, the treatment fluids of the present disclosure may include a lost circulation material ("LCM"). In one or more embodiments, the LCM may include plurality of LCM particles. As described herein, the terms "particles" and "particulates" may encompass a single type of particle and/or mixtures of types of particles. As described herein, the term "type of particle" may indicate particles that are differentiated from other particles, for example, by composition, shape, or PSD. In some embodiments, the plurality of particles may include a first type of particles, a second type of particles, and a third type of particles that can each be differentiated from the others by at least one of composition, shape, size, and/or PSD. In some embodiments, the plurality of particles may include one or more types of particles including one or more of graphitic material, ground marble, ground cellulosic material, and the like. In certain embodiments, the ground cellulosic material may include one or more ground nut shells and ground fibrous cellulosic materials. In one or more embodiments, the one or more ground nut shells may include one or more of walnut shells, peanut shells, almond shells, cashew shells, brazil nut shells, chestnut shells, pistachio shells, and pecan shells, and the like.

In one or more embodiments, suitable LCM particles may include, but are not limited to, BARACARB® particulates (ground marble, available from Halliburton Energy Services, Inc.) including BARACARB® 5, BARACARB® 25, BARACARB® 50, BARACARB® 150, BARACARB® 600, BARACARB® 1200; graphitic particulates (resilient graphitic carbon, available from Halliburton Energy Services, Inc.) including STEELSEAL® 50, STEELSEAL® 150, STEELSEAL® 400, STEELSEAL® 1000, and Graphite BARACARB®; walnut particulates (ground walnut shells, available from Halliburton Energy Services, Inc.) including WALL-NUT® coarse, WALL-NUT® medium, WALL-NUT® fine, and Walnut BARASHIELD®; BARA-PLUG® (sized salt, available from Halliburton Energy Services, Inc.) including BARAPLUG® 20, BARAPLUG® 50, and BARAPLUG® 3/300; BARAFLAKE® (flake calcium carbonate, available from Halliburton Energy Services, Inc.); fibers of cellulose including viscose cellulosic fibers, oil coated cellulosic fibers, and fibers derived from a plant product like paper fibers; carbon including carbon fibers; melt-processed inorganic fibers including basalt fibers, woolastonite fibers, non-amorphous metallic fibers, metal oxide fibers, mixed metal oxide fibers, ceramic fibers, and glass fibers; polymeric fibers including polypropylene fibers and poly(acrylic nitrile) fibers; metal oxide fibers; mixed metal oxide fibers; and the like; and any combination thereof. Examples fibers of cellulose may also include, but not be limited to, PAN fibers, i.e., carbon fibers derived from poly(acrylonitrile); PANEX® fibers (carbon fibers, available from Zoltek) including PANEX® 32, PANEX® 35-0.125", and PANEX® 35-0.25"; PANOX® (oxidized PAN fibers, available from SGL Group); rayon fibers including BDF™ 456 (rayon fibers, available from Halliburton Energy Services, Inc.); poly(lactide) ("PLA") fibers; alumina fibers; cellulosic fibers; BAROFIBRE® fibers including BAROFIBRE®, BAROFIBRE® C, and BAROFIBRE® 0 (ground cellulosic fiber, available from Halliburton Energy Services, Inc.); and the like; and any combination thereof.

In one or more embodiments, the LCM particles may include one or more types of the following particles and any combination thereof. In one or more embodiments, the LCM particles may include about 9-10% by weight of particles made of graphitic material with a d50 of about 205+/−15 microns. In one or more embodiments, the LCM particles may include about 18-20% by weight of particles made of ground marble with a d50 of around 25+/−5 microns. In one or more embodiments, the LCM particles may include about 18-20% by weight of particles made of ground marble with a d50 of around 50+/−10 microns. In one or more embodiments, the LCM particles may include about 10-19% of particles made of ground fibrous cellulosic material. In one or more embodiments, the LCM particles may include about 18-20% by weight of particles made of graphitic material with a d50 of around 50+/−10 microns. In one or more embodiments, the LCM particles may include about 18-20% by weight of particles made of ground walnut shells with a d50 of about 215+/−20 microns.

In certain embodiments, the LCM particles of the present disclosure may exhibit a multi-modal particle size distribution. As used herein the term, "particle size distribution" ("PSD") refers to a list of values or a mathematical function that defines the relative amount by volume of particles present within a fluid according to size. In some instances, the particles described herein may have a PSD characterized by a d10, a d25, a d50, a d75, and a d90. As used herein, the term "dn" (e.g., d10, d25, d50, d75, or d90) refers to a diameter for which n % by volume of the particles have a smaller diameter. The dn for particles described herein may be determined by any suitable means (e.g., sieve analysis, optical counting methods, image analysis, laser diffraction, light scattering, interaction with x-rays, interactions with neutrons, acoustic spectroscopy, sedimentation, elutriation, and the like). One skilled in the art would recognize that in the methods described herein when the one plurality of particles is compared to another by PSD, dn, or both (e.g., $d10_{SCR}$ vs $d10_{REP}$), the same technique for determining PSD, dn, or both is used for all pluralities of particles being compared. As used herein, lost circulation materials having a "multi-modal PSD" are materials in which a significant number of particles are of a size at least an order of magnitude removed from the mean particle size. In certain embodiments, lost circulation materials may exhibit a tri-modal PSD. In some embodiments, the lost circulation material may have a PSD d10 value ranging from about 20 microns to about 50 microns. In some embodiments, the lost circulation material may have a PSD d10 value ranging from about 20 microns to about 50 microns. In some embodiments, the lost circulation material may have a PSD d50 value ranging from about 65 microns to about 80 microns. In some embodiments, the lost circulation material may have a PSD d50 value ranging from about 55 microns to about 90 microns. In some embodiments, the lost circulation material may have a PSD d90 value ranging from about 250 microns to about 300 microns. In some embodiments, the lost circulation material may have a PSD d90 value ranging from about 240 microns to about 340 microns.

In some embodiments, the lost circulation material may have a PSD appropriate to pass through an American Petroleum Institute ("API") Screen Number ranging from about 30 to about 70. In some embodiments, the lost circulation material may have a PSD appropriate to pass through an API Screen Number ranging from about 40 to about 60. In some embodiments, the lost circulation material may have a PSD appropriate to pass through an API Screen Number ranging from about 35 to about 45. In some embodiments, the lost circulation material may have a PSD appropriate to pass through an API Screen Number ranging from about 55 to about 65.

Figure 1:
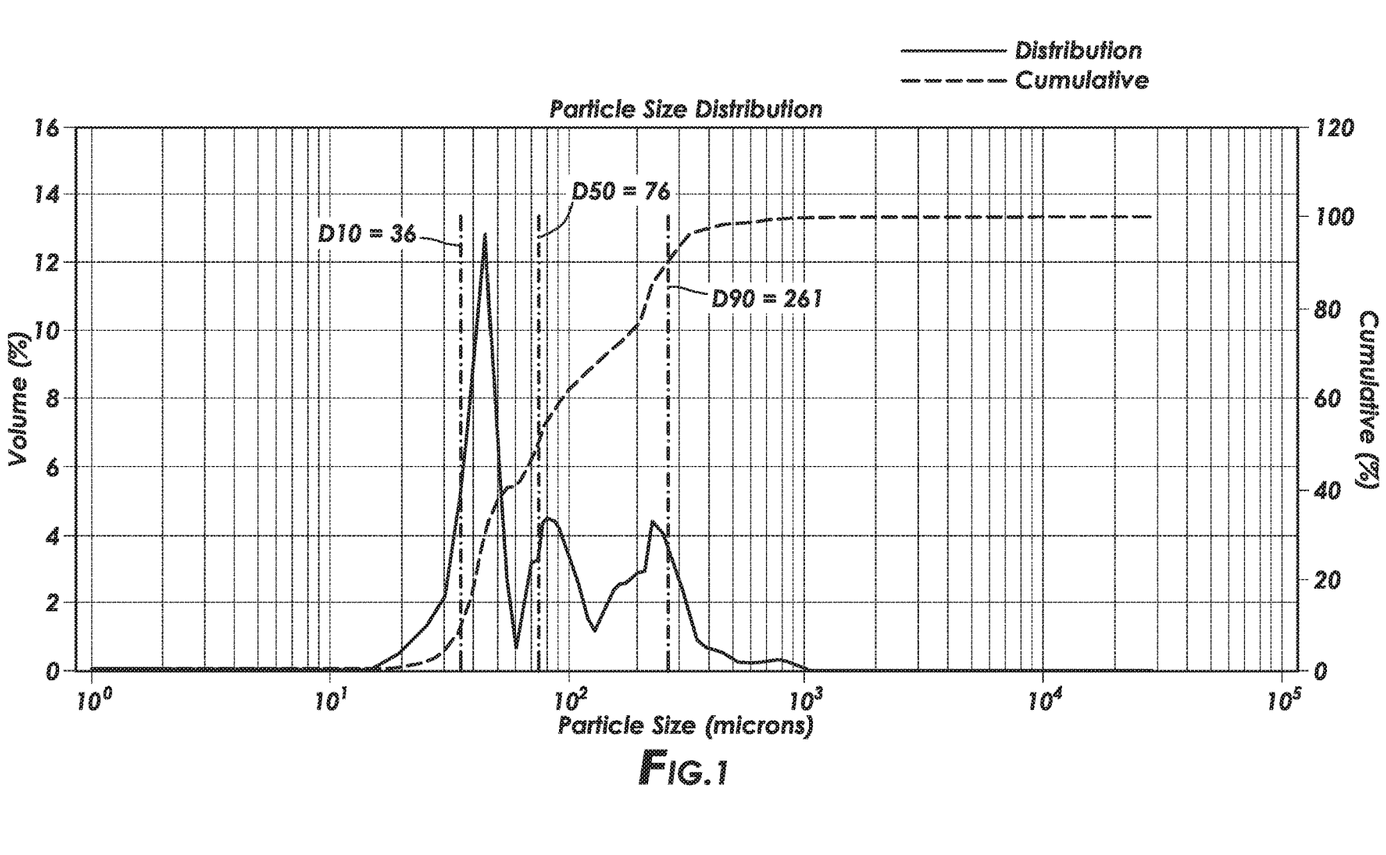
FIG. 1 is a plot demonstrating a trimodal particle size distribution for a plurality of particles included in the lost circulation material in accordance with one or more embodiments of the present disclosure.

FIG. 1 is a plot illustrating a trimodal particle size distribution for a plurality of particles included in the lost circulation material in accordance with one or more embodiments of the present disclosure. In one or more embodiments, the plurality of particles may have a d10 of about 36, a d50 of about 76, and a d90 of about 261.

Figure 2:
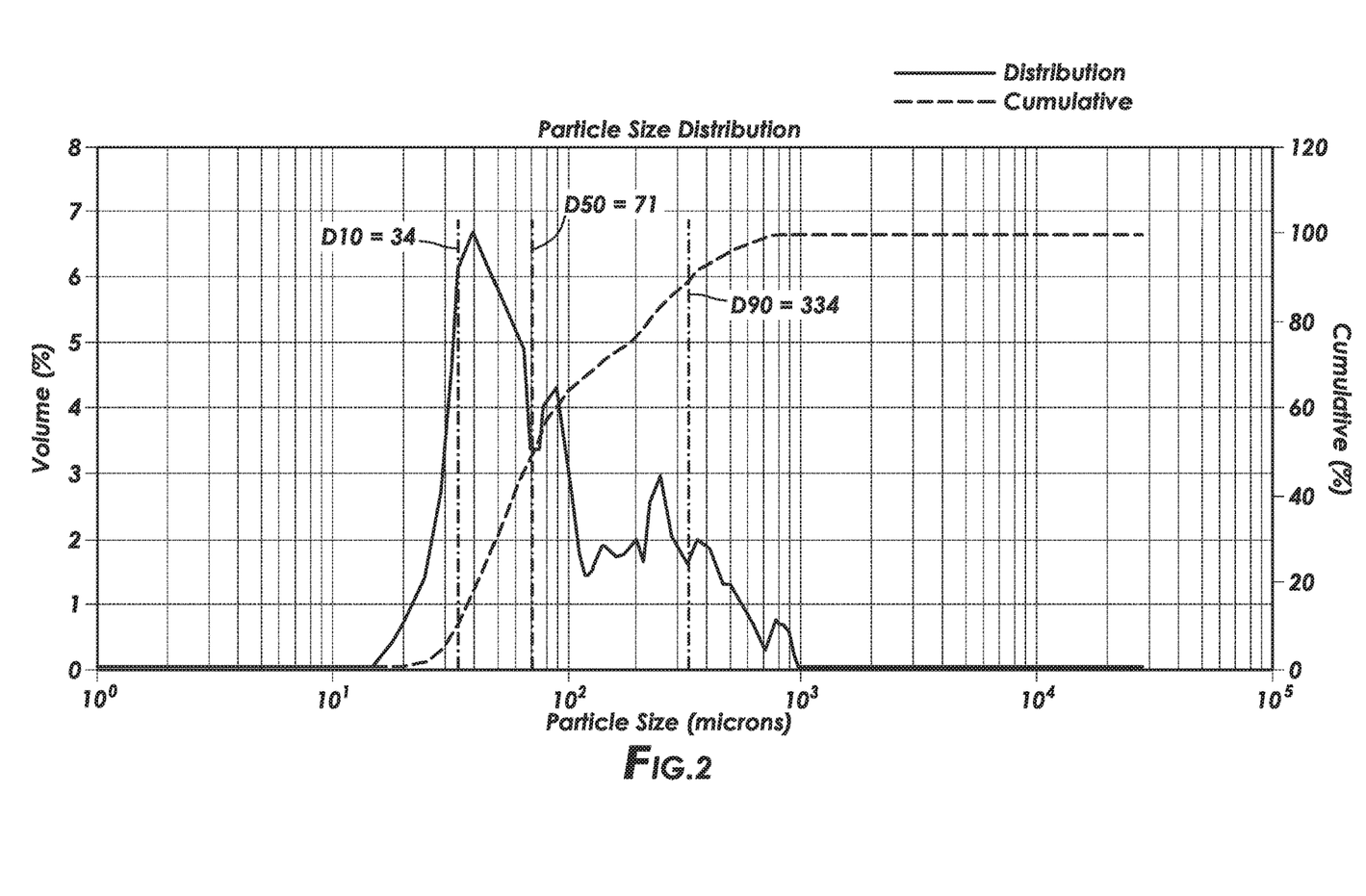
FIG. 2 is a plot demonstrating a trimodal particle size distribution for a plurality of particles included in the lost circulation material in accordance with one or more embodiments of the present disclosure.

FIG. 2 is a plot illustrating a trimodal particle size distribution for a plurality of particles included in the lost circulation material in accordance with one or more embodiments of the present disclosure. In one or more embodiments, the plurality of particles may have a d10 of about 34, a d50 of about 71, and a d90 of about 334.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

In some embodiments, the lost circulation materials may be processed (e.g., ground) into particles of a multi-modal particle size distribution. In some embodiments, the lost circulation materials may be processed by mechanically sizing, cutting or, chopping the lost circulation materials into particles using any suitable methodologies for such processes. In some embodiments, the plurality of lost circulation material particles may include two or more different materials. The lost circulation materials suitable for use in this disclosure may include particles of any suitable geometry, including, but not limited to beads, hollow beads, spheres, ovals, fibers, rods, pellets, platelets, disks, plates, ribbons, and the like, or combinations thereof.

The treatment fluids used in the methods and compositions of the present disclosure may include any base fluid known in the art. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods and compositions of the present disclosure may include water from any source. Such aqueous fluids may include fresh water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. Examples of non-aqueous fluids that may be suitable for use in the methods and compositions of the present disclosure include, but are not limited to oils, hydrocarbons, organic liquids, and the like. One of ordinary skill in the art, with the benefit of this disclosure, will recognize when such density and/or pH adjustments are appropriate. In certain embodiments, the treatment fluids may include a mixture of one or more fluids and/or gases, including but not limited to emulsions, foams, and the like.

In one or more embodiments, the lost circulation material used in the methods and the compositions of the present disclosure may be present in the treatment fluid in an amount of from about 0.01 pounds per barrel ("ppb") to about 200 ppb based on the total weight of the treatment fluid. In one or more embodiments, the lost circulation material used in the methods and the compositions of the present disclosure may be present in the treatment fluid in an amount of from about 0.01 ppb to about 40 ppb based on the total weight of the treatment fluid. In one or more embodiments, the lost circulation material used in the methods and the compositions of the present disclosure may be present in the treatment fluid in an amount of from about 0.01 ppb to about 20 ppb based on the total weight of the treatment fluid. In one or more embodiments, the lost circulation material used in the methods and the compositions of the present disclosure may be present in the treatment fluid in an amount of from about 0.01 ppb to about 10 ppb based on the total weight of the treatment fluid. In one or more embodiments, the lost circulation material used in the methods and the compositions of the present disclosure may be present in the treatment fluid in an amount of from about 10 ppb to about 20 ppb based on the total weight of the treatment fluid. In one or more embodiments, the lost circulation material used in the methods and the compositions of the present disclosure may be present in the treatment fluid in an amount of from about 10 ppb to about 40 ppb based on the total weight of the treatment fluid. In one or more embodiments, the lost circulation material used in the methods and the compositions of the present disclosure may be present in the treatment fluid in an amount of from about 10 ppb to about 24 ppb based on the total weight of the treatment fluid. In one or more embodiments, the lost circulation material used in the methods and the compositions of the present disclosure may be present in the treatment fluid in an amount of from about 24 ppb to about 40 ppb based on the total weight of the treatment fluid. In one or more embodiments, the lost circulation material used in the methods and the compositions of the present disclosure may be present in the treatment fluid in an amount of from about 20 ppb to about 24 ppb based on the total weight of the treatment fluid.

In certain embodiments, the treatment fluids used in the methods and compositions of the present disclosure optionally may include any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, paraffin inhibitors, asphaltene inhibitors, gas hydrate inhibitors, catalysts, clay control agents, biocides, friction reducers, anti-foam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the lost circulation material and/or other components of the treatment fluid may be metered directly into a base fluid to form a treatment fluid. In certain embodiments, the base fluid may be mixed with the lost circulation material and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure in some embodiments provides methods for using the treatment fluids to carry out a variety of subterranean treatments, including but not limited to, hydraulic fracturing treatments, acidizing treatments, and drilling operations. In some embodiments, the treatment fluids of the present disclosure may be used in treating a portion of a subterranean formation, for example, in treating a fluid loss in at least a portion of a permeable subterranean formation. In certain embodiments, a treatment fluid may be introduced into a subterranean formation. In some embodiments, the treatment fluid may be introduced into a wellbore that penetrates a subterranean formation.

In some embodiments, the treatment fluid including a lost circulation material may be introduced at a pressure sufficient to cause at least a portion of the treatment fluid to penetrate at least a portion of the subterranean formation, and the treatment fluid may be allowed to interact with the subterranean formation so as to plug or divert fluid from one or more loss zones in the subterranean formation. Introduction of the treatment fluid may in some of these embodiments be carried out at or above a pressure sufficient plug or divert a flow path of fluid from within a subterranean formation. In other embodiments, the treatment fluid may be introduced to divert a flow path of fluid from at least a portion of a fractured formation to reduce water/gas production in production wells (e.g., water and/or gas shutoff) or to provide profile modification in injection wells (e.g., conformance control treatment). In other embodiments, the treatment fluid may be introduced during cementing or drilling operations as a component of lost circulation control.

In certain embodiments, the treatment fluid including a lost circulation material may be introduced into a subterranean formation in an effective amount for modifying the permeability of one or more loss zones in the subterranean formation. In certain embodiments, the treatment fluid may be introduced as a pill and pumped into at least a portion of a subterranean formation. In some embodiments, a squeeze pressure from the surface may cause the treatment fluid to lose fluid into the subterranean formation and the treatment fluid including the lost circulation material to form a solid mass, which may divert a flow path of fluid from at least a portion of the one or more loss zones of the subterranean formation. As used herein, the term "solid mass" refers to compressed LCM particles. In certain embodiments, the solid mass may have a solid low permeability to water and/or other treatment fluids. In certain embodiments, the gel mass may create a barrier to the flow of water and/or other treatment fluids in the portion of the subterranean formation containing the treatment fluid.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, business-related, government-related, and other constraints, which vary by implementation and from time to time. While a developer's efforts might be mixture and time-consuming, such efforts would be, nevertheless, a routine undertaking for those of ordinary skill the art having benefit of this disclosure.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 3, the systems and methods of the present disclosure may be associated with an exemplary wellbore drilling assembly 1, according to one or more embodiments. It should be noted that while FIG. 3 generally depicts a land-based drilling assembly, those skilled in the art will readily recognize that the principles described herein are equally applicable to subsea drilling operations that employ floating or sea-based platforms and rigs, without departing from the scope of the disclosure. In certain embodiments, the methods and systems of the present disclosure may be performed at the same location as the drilling assembly 1 of FIG. 3 or at a different location (e.g., a remote location).

Figure 3:
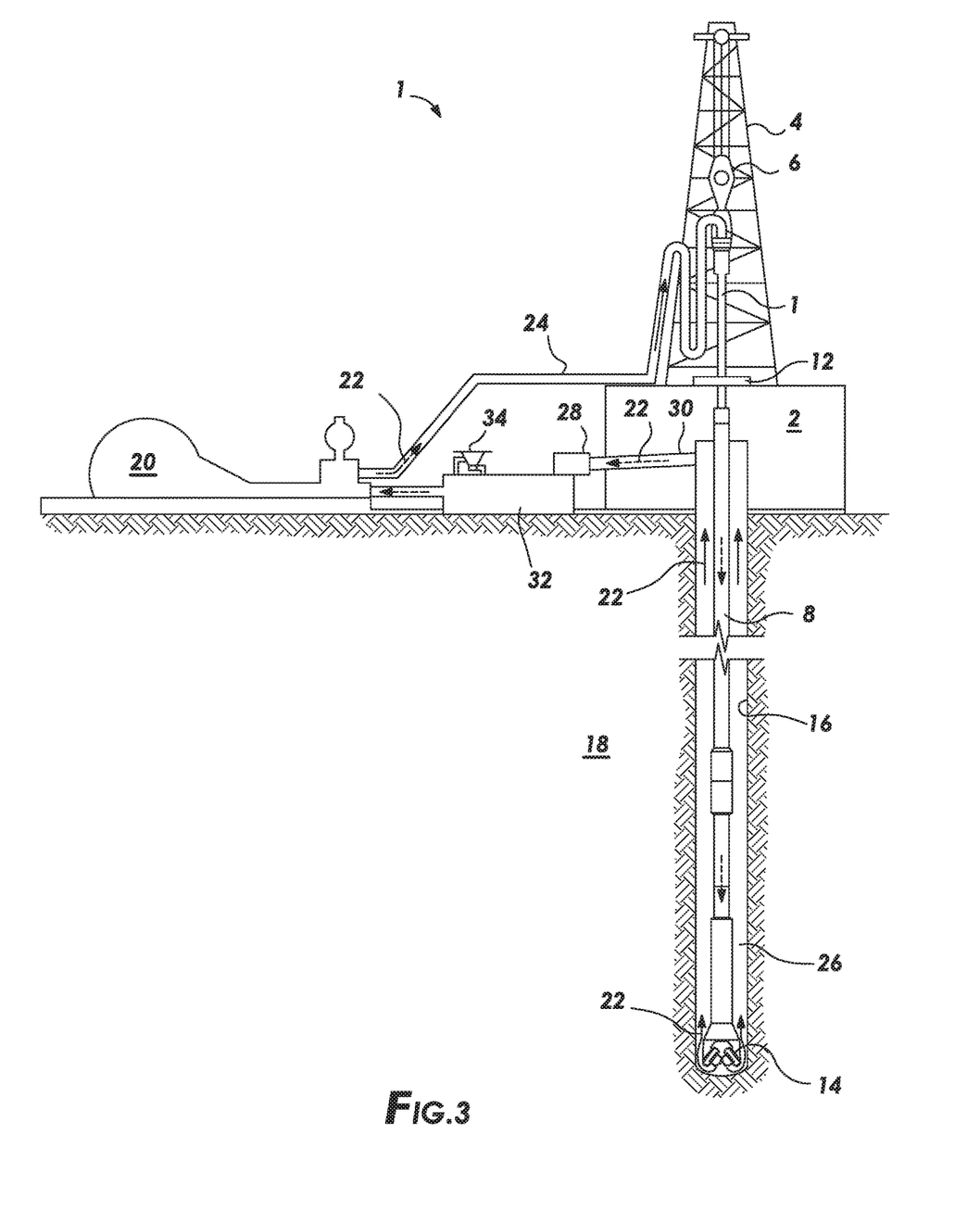
FIG. 3 is a schematic diagram of a system that may deliver lost circulation materials of the present disclosure to a downhole location in accordance with certain embodiments of the present disclosure.

As illustrated, the drilling assembly 1 may include a drilling platform 2 that supports a derrick 4 having a traveling block 6 for raising and lowering a drill string 8. The drill string 8 may include, but is not limited to, drill pipe and coiled tubing, as generally known to those skilled in the art. A kelly 10 supports the drill string 8 as it is lowered through a rotary table 12. A drill bit 14 is attached to the distal end of the drill string 8 and is driven either by a downhole motor and/or via rotation of the drill string 8 from the well surface. As the bit 14 rotates, it creates a wellbore 16 that penetrates various subterranean formations 18.

A pump 20 (e.g., a mud pump) circulates wellbore fluid 22 (e.g., a drilling fluid) through a feed pipe 24 and to the kelly 10, which conveys the wellbore fluid 22 downhole through the interior of the drill string 8 and through one or more orifices in the drill bit 14 (or optionally through a bypass or ports (not shown) along the drill string and above the drill bit 14). The wellbore fluid 22 is then circulated back to the surface via an annulus 26 defined between the drill string 8 and the walls of the wellbore 16. At the surface, the recirculated or spent wellbore fluid 22 exits the annulus 26 and may be conveyed to one or more fluid processing unit(s) 28 via an interconnecting flow line 30. In certain embodiments, the fluid processing unit(s) 28 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any additional fluid reclamation equipment. The fluid processing unit(s) 28 may further include one or more sensors, gauges, pumps, compressors, and the like. After passing through the fluid processing unit(s) 28, a "cleaned" wellbore fluid 22 may be recirculated through the feed pipe and/or deposited into one or more nearby retention pits 32 (e.g., a mud pit) for later re-use. While illustrated as being arranged at the outlet of the wellbore 16 via the annulus 26, those skilled in the art will readily appreciate that the fluid processing unit(s) 28 may be arranged at any other location in the drilling assembly 1 to facilitate its proper function, without departing from the scope of the scope of the disclosure.

Additives may be added to the wellbore fluid 22 via a mixing hopper 34 communicably coupled to or otherwise in fluid communication with the retention pit 32. The mixing hopper 34 may include, but is not limited to, mixers and related mixing equipment known to those skilled in the art. In other embodiments, however, additives may be added to the wellbore fluid 22 at any other location in the drilling assembly 1. In at least one embodiment, for example, there could be more than one retention pit 32, such as multiple retention pits 32 in series. Moreover, the retention pit 32 may be representative of one or more fluid storage facilities and/or units where the particles disclosed herein may be stored, reconditioned, and/or regulated until added to the wellbore fluid 22.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Example 1

In this example, one or more treatment fluids including lost circulation material samples were tested using multiple amounts and multiple pore sizes. The tests were conducted in three conduits each including a disk with different pore sizes of 500 microns, 200 microns, and 120 microns respectively. The lost circulation material samples were included in the treatment fluid in amounts of 20 pounds per barrel ("ppb") and 10 ppb. The treatment fluid was pumped through the disks at a differential pressure of 500 pounds per square inch ("psi"). Fluid loss across the disks was measured in milliliters (mL) at intervals of 1 minute, 7.5 minutes, 15 minutes, and 30 minutes, the results of which are reported in Table 1 below.

TABLE 1

Particle Plugging Apparatus (PPA) Performance Testing of LCM at 500 psi on 500/200 Metal Disks and 120 Micron Ceramic Disk

| | Sample Name Sample 1 | | | | | |
|---|---|---|---|---|---|---|
| Amt., ppb | 20 | 10 | 20 | 10 | 20 | 10 |
| Slot size, μm | 500 | | 200 | | 120 (Ceramic Disk) | |
| Differential Pressure, psi | 500 | | 500 | | 500 | |
| PPA Fluid loss | | | | | | |
| 1 min, mL | 3.0 | 20.0 | 0.0 | 1.0 | 1.0 | 1.5 |
| 7.5 min, mL | 4.0 | 22.0 | 0.5 | 1.5 | 1.5 | 2.0 |
| 15 min, mL | 4.5 | 23.0 | 0.5 | 1.5 | 2.0 | 2.5 |
| 30 min, mL | 5.0 | 25.0 | 0.5 | 1.5 | 2.0 | 3.0 |

Example 2

In this example, one or more treatment fluids including different samples of lost circulation materials were tested using multiple differential pressures. The samples were tested against materials Material X (which includes a lost circulation material having a multi-modal particle size distribution including a d10 value of about 44 microns, a d50 value of about 170 microns, and a d90 value of about 538 microns) and Material Y (which includes a blend of modified low molecular weight cellulosic material). The tests were conducted within conduits each including a metal disk with a pore size of 500 microns. Each lost circulation material sample was included in the treatment fluid in an amount of 20 ppb. The treatment fluid was pumped through the disks at differential pressures of 500 psi, 1000 psi, and 2000 psi. Fluid loss across the disks was measured in milliliters (mL) at intervals of 1 minute, 7.5 minutes, 15 minutes, and 30 minutes, the results of which are reported in Table 2 below.

TABLE 2

PPA Performance Testing of LCM at 500/1000/2000 psi on a 500 Micron Metal Disk

| | Sample Name | | | | | | | | |
|---|---|---|---|---|---|---|---|---|---|
| | Sample 1 | | | Material X | | | Material Y | | |
| Amt., ppb | 20 | | | 20 | | | 20 | | |
| Slot size, μm | 500 | | | 500 | | | 500 | | |
| Differential Pressure, psi | 500 | 1000 | 2000 | 500 | 1000 | 2000 | 500 | 1000 | 2000 |
| PPA Fluid loss | | | | | | | | | |
| 1 min, mL | 3.0 | 4.0 | 8.0 | 0.5 | 1.5 | 3.0 | 1.0 | 2.0 | 6.0 |
| 7.5 min, mL | 4.0 | 6.0 | 10.0 | 1.5 | 2.5 | 5.0 | 1.5 | 6.0 | 17.0 |
| 15 min, mL | 4.5 | 7.0 | 11.0 | 2.0 | 3.0 | 6.0 | 2.0 | 8.0 | 21.0 |
| 30 min, mL | 5.0 | 8.0 | 15.0 | 2.0 | 3.5 | 7.0 | 2.0 | 10.0 | 26.0 |

Example 3

In this example, one or more treatment fluids including different samples of lost circulation materials were tested using multiple differential pressures. The samples were tested against materials Material X (which includes a lost circulation material having a multi-modal particle size distribution including a d10 value of about 44 microns, a d50 value of about 170 microns, and a d90 value of about 538 microns) and Material Y (which includes a blend of modified low molecular weight cellulosic material). The tests were conducted in conduits each including ceramic disks with a pore size of 120 microns. Each lost circulation material sample was included in the treatment fluid in an amount of 20 ppb. The treatment fluid was pumped through the disks at differential pressures of 500 psi, 1000 psi, and 2000 psi. Fluid loss across the disks was measured in milliliters (mL) at intervals of 1 minute, 7.5 minutes, 15 minutes, and 30 minutes, the results of which are reported in Table 3 below.

TABLE 3

PPA Performance Testing of LCM at 500/1000/2000 psi on a 120 Micron Metal Disk

| | Sample 1 | | | Material X | | | Material Y | | |
|---|---|---|---|---|---|---|---|---|---|
| Amt., ppb | 20 | | | 20 | | | 20 | | |
| Ceramic disk, µm | 120 | | | 120 | | | 120 | | |
| Differential Pressure, psi | 500 | 1000 | 2000 | 500 | 1000 | 2000 | 500 | 1000 | 2000 |
| | | | | PPA Fluid loss | | | | | |
| 1 min, mL | 1.0 | 1.0 | 1.0 | 1.0 | 1.5 | 2.0 | 0.5 | 1.0 | 1.0 |
| 7.5 min, mL | 1.5 | 1.5 | 1.5 | 1.5 | 2.0 | 2.5 | 1.0 | 1.5 | 1.5 |
| 15 min, mL | 2.0 | 2.0 | 2.0 | 2.0 | 2.5 | 3.0 | 1.0 | 2.0 | 2.0 |
| 30 min, mL | 2.0 | 2.5 | 2.5 | 2.5 | 3.0 | 3.5 | 1.5 | 2.0 | 2.5 |

Example 4

In this example, one or more treatment fluids including different samples of lost circulation materials were tested using multiple differential pressures and in multiple amounts. The samples were tested against materials Material Z (which includes a blend of modified cellulosic fibers and granules). The tests were conducted in three conduits each including metal disks with a pore size of 500 microns. The lost circulation material samples were included in different samples of the treatment fluid in amounts of 20 ppb and 10 ppb. The treatment fluid was pumped through the disks at differential pressures of 500 psi, 1000 psi, and 2000 psi. Fluid loss across the disks was measured in milliliters (mL) at intervals of 1 minute, 7.5 minutes, 15 minutes, and 30 minutes, the results of which are reported in Table 4 below.

TABLE 4

PPA Performance Testing of LCM at 500/1000/2000 psi on a 500 Micron Metal Disk

| | Sample 2 | | | | | | Material Z | | |
|---|---|---|---|---|---|---|---|---|---|
| Amt., ppb | 20 | | | 10 | | | 10 | | |
| Slot size, µm | | | | 500 | | | | | |
| Differential Pressure, psi | 500 | 1000 | 2000 | 500 | 1000 | 2000 | 500 | 1000 | 2000 |
| | | | | PPA Fluid loss | | | | | |
| 1 min, mL | 0.5 | 0.5 | 1.0 | 5.0 | 8.0 | 10.0 | 1.0 | 1.0 | 1.0 |
| 7.5 min, mL | 0.5 | 1.0 | 1.5 | 6.0 | 9.0 | 11.0 | 1.5 | 1.5 | 1.5 |
| 15 min, mL | 0.5 | 1.0 | 1.5 | 6.0 | 10.0 | 12.0 | 1.5 | 2.0 | 2.0 |
| 30 min, mL | 0.5 | 1.0 | 1.5 | 7.0 | 10.0 | 13.0 | 1.5 | 2.0 | 2.0 |

Example 5

In this example, two samples of lost circulation materials were tested using a sieve analysis. The sieve analysis was conducted using sieves having US sieve sizes ranging from about US Sieve No. 20 to about U.S. Sieve No. 500. The two samples of lost circulation material (about 25 grams each) were sifted through sieves of progressive sizes for PSD determination. The percent captured of the total lost circulation material was measured at each pass through the progressive sieve sizes, as reported in Table 5 below.

TABLE 5

Sieve Analysis of LCM

| Dry Sieve Analysis, Sieve No # | Sample 2 | Captured | Sample 1 | Captured |
|---|---|---|---|---|
| % pass thru US # 20 | 98.68 | 1.32 | 99.84 | 0.16 |
| % pass thru US # 25 | 97.96 | 0.72 | 99.52 | 0.32 |
| % pass thru US # 35 | 95.88 | 2.08 | 98.52 | 1.00 |
| % pass thru US # 40 | 94.40 | 1.48 | 97.76 | 0.76 |
| % pass thru US # 45 | 92.79 | 1.61 | 96.75 | 1.01 |
| % pass thru US # 50 | 90.99 | 1.80 | 95.35 | 1.40 |
| % pass thru US # 60 | 86.03 | 4.96 | 89.86 | 5.49 |
| % pass thru US # 70 | 79.86 | 6.17 | 82.53 | 7.33 |
| % pass thru US # 80 | 72.94 | 6.92 | 74.15 | 8.38 |
| % pass thru US # 100 | 69.14 | 3.80 | 69.94 | 4.21 |
| % pass thru US # 120 | 65.65 | 3.49 | 66.21 | 3.73 |
| % pass thru US # 140 | 63.01 | 2.64 | 63.29 | 2.92 |
| % pass thru US # 170 | 58.89 | 4.12 | 57.88 | 5.41 |
| % pass thru US # 200 | 52.96 | 5.93 | 50.86 | 7.02 |
| % pass thru US # 270 | 39.59 | 13.37 | 38.52 | 12.34 |
| % pass thru US # 325 | 34.11 | 5.48 | 31.74 | 6.78 |
| % pass thru US # 400 | 14.11 | 20.00 | 11.74 | 20.00 |
| % pass thru US # 500 | 0 | 14.11 | 0 | 11.74 |
| | | 100.00 | | 100.00 |

PSDs of the two sample lost circulation materials were determined based on the sieve analysis results, as reported in Table 6 below.

TABLE 6

LCM PSD Determination Based on Sieve Analysis

| Sample Name | Method | D(0.1 μm) | D(0.5 μm) | D(0.9 μm) |
|---|---|---|---|---|
| Sample 1 | Sieve analysis PSD | 47 | 78 | 259 |
| Sample 2 | Sieve analysis PSD | 26 | 79 | 294 |

An embodiment of the present disclosure is a treatment fluid including a base fluid and a lost circulation material including a plurality of particles having a multi-modal particle size distribution including a d10 value ranging from about 20 to about 50 microns, a d50 value ranging from about 55 to about 90 microns, and d90 value ranging from about 240 to about 340 microns. In some embodiments, the plurality of particles includes one or more materials selected from a group consisting of graphitic material, ground marble, ground fibrous cellulosic material, ground walnut shells, and any combination thereof. In some embodiments, at least a portion of the plurality of particles include graphitic material and have a d50 of about 190 to about 220 and are present in an amount of from about 9% to about 10% by weight of the lost circulation material. In some embodiments, at least a portion of the plurality of particles include ground marble and have a d50 of about 20 to about 30 and are present in an amount of from about 18% to about 20% by weight of the lost circulation material. In some embodiments, at least a portion of the plurality of particles include ground marble and have a d50 of about 40 to about 60 and are present in an amount of from about 18% to about 20% by weight of the lost circulation material. In some embodiments, the plurality of particles includes ground fibrous cellulosic fibers and are present in an amount of from about 10% to about 19% by weight of the lost circulation material. In some embodiments, at least a portion of the plurality of particles are graphitic material having a d50 of about 40 to about 60 and are from about 18% to about 20% by weight of the lost circulation material. In some embodiments, at least a portion of the plurality of particles are ground walnut shells having a d50 of about 195 to about 235 and are from about 18% to about 20% by weight of the lost circulation material. In some embodiments, the base fluid includes an aqueous liquid, a hydrocarbon liquid, or a combination thereof. In some embodiments, the treatment fluid further includes one or more additives selected from the group consisting of a salt, a surfactant, an acid, a diverting agent, a fluid loss control additive, a gas, nitrogen, carbon dioxide, a surface modifying agent, a tackifying agent, a foamer, a corrosion inhibitor, a scale inhibitor, a paraffin inhibitor, an asphaltene inhibitor, a gas hydrate inhibitor, a catalyst, a clay control agent, a biocide, a friction reducer, an antifoam agent, a bridging agent, a flocculant, an $H_2S$ scavenger, a $CO_2$ scavenger, an oxygen scavenger, a lubricant, a viscosifier, a weighting agent, a relative permeability modifier, a resin, a wetting agent, a coating enhancement agent, a filter cake removal agent, an antifreeze agents, and any combination thereof. In some embodiments, the lost-circulation material is present in the treatment fluid in an amount of from about 10 to about 40 pounds per barrel based on the total weight of the treatment fluid.

Another embodiment of the present disclosure is a method including the step of introducing a treatment fluid that includes a base fluid and a lost circulation material into a wellbore penetrating at least a portion of a subterranean formation, wherein the lost circulation material includes a plurality of particles having a multi-modal particle size distribution including a d10 value ranging from about 20 to about 50 microns, a d50 value ranging from about 55 to about 90 microns, and d90 value ranging from about 240 to about 340 microns. In some embodiments, the plurality of particles include one or more materials selected from a group consisting of graphitic material, ground marble, ground fibrous cellulosic material, ground walnut shells, and any combination thereof. In some embodiments, the base fluid includes an aqueous liquid, a hydrocarbon liquid, or a combination thereof. In some embodiments, the lost-circulation is present in the treatment fluid in an amount of from about 0.01 to about 200 pounds per barrel based on the total weight of the treatment fluid. In some embodiments, at least a portion of the plurality of particles of the lost circulation material to form a solid mass. In some embodiments, the lost circulation material to divert a flow path of fluid from at least a portion of a loss zone.

Another embodiment of the present disclosure is a method including the steps of providing a treatment fluid including a base fluid; and a lost circulation material including a plurality of particles having a multi-modal particle size distribution including a d10 value ranging from about 20 to about 50 microns, a d50 value ranging from about 55 to about 90 microns, and d90 value ranging from about 240 to about 340 microns; and introducing the treatment fluid into a wellbore penetrating at least a portion of a subterranean formation including one or more fractures. In some embodiments, further including the step of allowing at least a portion of the plurality of particles of the lost circulation material to form a solid mass. In some embodiments, further including the step of allowing the lost circulation material to divert a flow path from the one or more fractures.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    introducing a treatment fluid that comprises a base fluid and a lost circulation material into a wellbore penetrating at least a portion of a subterranean formation, wherein the lost circulation material comprises a plurality of particles having a multi-modal particle size distribution comprising a d10 value ranging from about 20 to about 50 microns, a d50 value ranging from about 55 to about 90 microns, and d90 value ranging from about 240 to about 340 microns, wherein the plurality of particles comprise graphitic material, ground marble, ground fibrous cellulosic material, and ground walnut shells, wherein a portion of the plurality of particles comprising ground walnut shells is present in an amount of from about 18% to about 20% by weight of the lost circulation material.

2. The method of claim 1, wherein the base fluid comprises an aqueous liquid, a hydrocarbon liquid, or a combination thereof.

3. The method of claim 1, wherein the lost-circulation material is present in the treatment fluid in an amount of from about 0.01 to about 200 pounds per barrel based on the total weight of the treatment fluid.

4. The method of claim 1 further comprising allowing at least a portion of the plurality of particles of the lost circulation material to form a solid mass.

5. The method of claim 1, further comprising allowing the lost circulation material to divert a flow path of fluid from at least a portion of a loss zone.

6. The method of claim 1, wherein at least 90% of the lost circulation material is operable to pass through a 40-mesh sieve.

7. A method comprising:
    providing a treatment fluid comprising:
        a base fluid; and
        a lost circulation material comprising a plurality of particles having a multi-modal particle size distribution comprising a d10 value ranging from about 20 to about 50 microns, a d50 value ranging from about 55 to about 90 microns, and d90 value ranging from about 240 to about 340 microns, wherein the plurality of particles comprise graphitic material, ground marble, ground fibrous cellulosic material, and ground walnut shells, wherein a portion of the plurality of particles comprising ground walnut shells is present in an amount of from about 18% to about 20% by weight of the lost circulation material; and
    introducing the treatment fluid into a wellbore penetrating at least a portion of a subterranean formation comprising one or more fractures.

8. The method of claim 7 further comprising allowing at least a portion of the plurality of particles of the lost circulation material to form a solid mass.

9. The method of claim 7 further comprising allowing the lost circulation material to divert a flow path from the one or more fractures.

10. The method of claim 7, wherein at least 90% of the lost circulation material is operable to pass through a 40-mesh sieve.

* * * * *